United States Patent
Broerman

(10) Patent No.: US 9,003,962 B2
(45) Date of Patent: Apr. 14, 2015

(54) ADJUSTABLE FLAVOR BAR AND SMOKER BOX FOR A GAS GRILL

(75) Inventor: Steven Raymond Broerman, San Diego, CA (US)

(73) Assignee: Grill Performance, San Diego, CA (US)

( * ) Notice: Subject to any disclaimer, the term of this patent is extended or adjusted under 35 U.S.C. 154(b) by 382 days.

(21) Appl. No.: 13/361,879

(22) Filed: Jan. 30, 2012

(65) Prior Publication Data

US 2013/0192476 A1  Aug. 1, 2013

(51) Int. Cl.
*A23B 4/044* (2006.01)

(52) U.S. Cl.
CPC ........................ *A23B 4/044* (2013.01)

(58) Field of Classification Search
CPC .............................. A23B 4/044; A47J 37/0731
USPC ...................................... 99/481, 474; 126/1 R
See application file for complete search history.

(56) References Cited

U.S. PATENT DOCUMENTS

| | | | |
|---|---|---|---|
| 3,019,720 A * | 2/1962 | Topper | 99/339 |
| 4,471,748 A * | 9/1984 | Venable | 126/1 E |
| D283,588 S * | 4/1986 | Stuckey | D7/332 |
| 4,770,157 A * | 9/1988 | Shepherd et al. | 126/25 R |
| 5,473,980 A * | 12/1995 | Carpenter | 99/446 |
| 6,279,566 B1 * | 8/2001 | Craven, Jr. | 126/41 R |
| 6,305,368 B1 * | 10/2001 | Rimback | 126/25 R |
| 6,701,829 B2 * | 3/2004 | Farrow | 99/482 |
| 7,270,122 B2 * | 9/2007 | Jones | 126/25 R |
| 7,757,604 B2 * | 7/2010 | Gonzalez | 99/482 |
| 7,866,256 B2 * | 1/2011 | Frigo | 99/340 |
| 2002/0166460 A1 * | 11/2002 | O'Shea | 99/482 |
| 2004/0025862 A1 * | 2/2004 | Lor et al. | 126/41 R |
| 2012/0266856 A1 * | 10/2012 | Zelek et al. | 126/25 R |

\* cited by examiner

*Primary Examiner* — Tu B Hoang
*Assistant Examiner* — Alba Rosario-Aponte
(74) *Attorney, Agent, or Firm* — Jonathan A. Kidney; TechLaw, LLP

(57) ABSTRACT

An adjustable food flavoring device with removable smoker box for use in a gas grill is disclosed. The apparatus includes an inverted V-shaped upper plate, an inverted V-shaped lower plate, a feature or features to prevent the movement of the assembly once a user obtains the desired length, a plurality of tabs to keep ceramic briquettes in their desired locations, and a removable smoker box in which to place articles for heating and burning to produce smoke that flavors the food being cooked on the grill.

15 Claims, 7 Drawing Sheets

ADJUSTABLE FLAVOR BAR AND SMOKER BOX FOR A GAS GRILL

FIELD OF THE INVENTION

The present invention relates to a food flavoring apparatus for gas barbeque grills, more specifically a combination of an adjustable flavor plate and removable smoke flavoring enclosure.

BACKGROUND

A gas grill is the most common apparatus used for outdoor cooking because of its simplicity. Ease of ignition, quick warm-up, uniform heating area, and ease of cleanup have made gas grills popular. However, there are drawbacks to gas grilling such as frequent flare-ups that burn food and the addition of little smoke flavor. Over the past few decades, attempts have been made and methods used to reduce flare ups and add smoke flavor to food, but none have created an apparatus that creates a superior gas grill cooking environment. The present disclosure details system(s) and method(s) that create a superior cooking environment, fits most gas grills, and is simple to install.

SUMMARY OF THE INVENTION

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect of various exemplary embodiments, a food flavoring apparatus for use in gas grills is provided comprising: an inverted substantially V-shaped upper plate with a smoker box cutout positioned substantially nearer to an end of the upper plate and substantially centered on a spine of the upper plate, an inverted substantially V-shaped lower plate, slidably inserted beneath the upper plate into a plurality of mating features of the upper plate, a smoker box comprising a bottom wall, two lateral walls substantially perpendicular to the bottom wall, and two transverse walls substantially perpendicular to the lateral and bottom walls, shaped to substantially fit into the upper plate smoker box cutout; and an inverted substantially V-shaped smoker box lid mounted on the smoker box.

In another aspect of various exemplary embodiments, A food flavoring apparatus kit, the kit comprising: an inverted substantially V-shaped upper plate with a smoker box cutout positioned substantially nearer to an end of the upper plate and substantially centered on a spine of the upper plate, an inverted substantially V-shaped lower plate, slidably inserted beneath the upper plate into a plurality of mating features of the upper plate, a smoker box comprising a bottom wall, two lateral walls substantially perpendicular to the bottom wall, and two transverse walls substantially perpendicular to the lateral and bottom walls, shaped to substantially fit into the upper plate smoker box cutout, an inverted substantially V-shaped smoker box lid mounted on the smoker box, and grilling stones or ceramic briquettes.

BRIEF DESCRIPTION OF THE DRAWINGS

The various embodiments can be better understood with reference to the following drawings. Those of skill in the art will understand that the drawings, described below, are for illustrative purposes only and are not intended to limit the scope of the present teachings in any way. Accordingly, other embodiments may be used in addition to or instead of the embodiments presented herein, without departing from the spirit and scope of this disclosure. When the same numeral appears in different drawings, it is intended to refer to the same or like components or steps.

DETAILED DESCRIPTION

Figure 1:
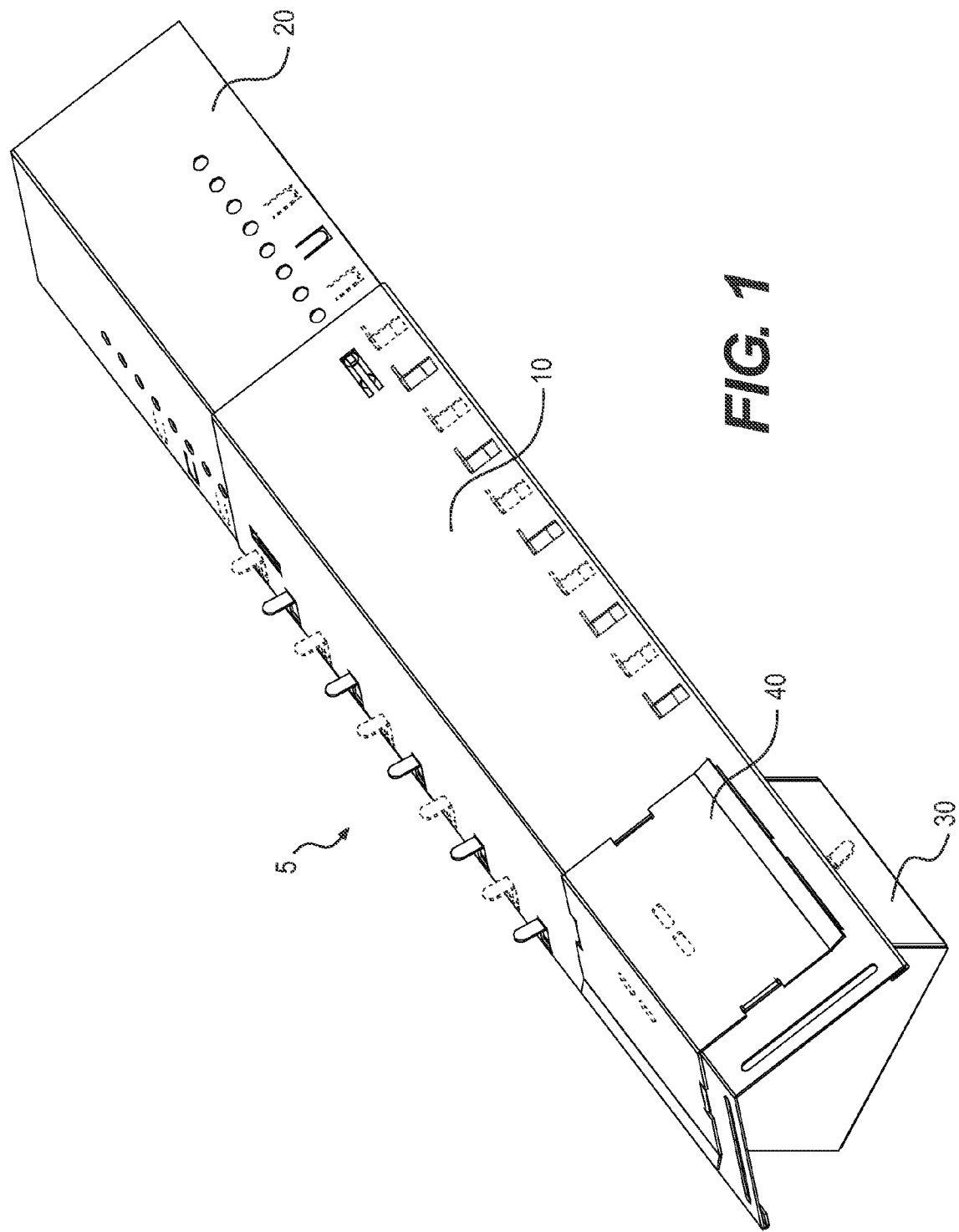
FIG. 1 is an illustration of an exemplary embodiment of the food flavoring apparatus.

Traditional gas grills have independent gas burners, although some grills have tubular burners with numerous perforations. In more modern gas grills, there are typically two or more gas burners aligned in a single row and evenly spaced between the sides of the gas grill. Each gas burner typically has a flame cover, alternatively named the sear bar or flavor bar, that sits a predetermined distance above the flame. Above the gas burner covers sit a cooking grate upon which food is placed. The cooking grate is spaced a predetermined distance above the gas burner covers to facilitate more even heating and not burn the food too quickly. Gas burner covers, as are all components inside a gas grill, are made of heat resistant metal such as carbon steel or stainless steel and can be coated with heat resistant coatings to minimize rusting. Gas burner covers are usually simple to remove in order to facilitate cleaning or replacement thereof.

The gas burner cover serves several different functions. First, it minimizes flare ups by preventing food, liquid, or liquidized animal fat from dripping onto an open flame. Second, when food, liquid, or liquidized animal fat drip onto the gas burner cover, then vaporization occurs. This vaporization creates a more desirable flavor. Third, the burner covers help keep burners clean and extend burner life. Fourth, the gas burner covers more evenly distribute heat by absorbing direct flame irradiating heat toward the food.

While gas burners are very popular, vast majority of gas grills are not sold equipped with an enclosure in which to place wood chips or other articles used to create smoke flavoring. These flavoring enclosures, alternatively named smoker boxes, are sold separately. Generally speaking, these smoker boxes are designed to limit the amount of airflow entering the enclosure in order to restrict oxygen to the smoking articles. This oxygen restriction causes the smoking articles to produce more smoke over a longer period of time without ignition. There are a number of factors that determine the time in which smoke is produced from a flavoring enclosure upon igniting a gas grill, such as opening size, wall thickness, and material composition.

Products currently available on the market replace the gas burner covers with an adjustable, elongated plate in an effort to more evenly distribute the heat. Some of these products are shaped as an inverted V, which radiate the heat perpendicularly from the top surfaces of the plate and spread the heat out over a wider grilling area. For example, U.S. Pat. No. 4,677,964, granted to Lohmeyer et al., discloses a portable gas grill having a lower gas burner assembly, an intermediate sear grid assembly and an upper cooking grid. The sear grid assembly includes inverted V-shaped sear bars that cause evaporation of greases from the food on the cooking grid. Also, U.S. Pat. No. 6,966,253 granted to Witzel, describes a V-shaped flavor plate used in a barbecue in place of briquettes. The V-shaped flavor plate has three inverted V-shaped sections forming three peaks and two valleys. However, the related disclosures provide no means for placing grilling rocks or ceramic briquettes onto the sear bars or flavor plates.

There is an apparatus that teaches a flavor bar mechanism in a gas barbeque that adjusts to various angles, but not various lengths. For instance, U.S. Pat. No. 7,241,466 granted to Dellinger, describes a gas grill or add-on component for a gas grill that provides the additional functionality of being able to cook with charcoal or wood chips on a gas grill by positioning moveable flaps in a second position thus providing a horizontal surface above the gas burner, yet below the cooking surface, upon which to place charcoal briquettes. Spaces on either side of each pair of flaps allow the gas burners to be used to ignite charcoal briquettes or wood chips. Again, however, the plates of the mechanism are fixed in length and cannot be adjusted to fit most gas grills. Furthermore, the device does not incorporate a smoker box because the related art device depends on using charcoal briquettes.

Finally, there is a device that combines a sear bar with a smoker box, U.S. Pat. No. 7,866,256 granted to Frigo, describes a smoker attachment for heating and burning smoking particles for a gas grill that includes a housing and end caps. The housing is an elongated hollow member with a triangular cross-section. The housing has open ends and a slot just below the apex. The triangular cavity of the housing holds the smoking particles. Triangularly-shaped end caps cover the open ends. For flavoring food on a gas grill, the smoker assembly, filled with smoking particles, is used in place of one sear bar located directly above one of the gas burners. More specifically, the smoker attachment may be inserted inside the gas grill in place of one or more of the sear bars that are located between the gas burners in the lower section and the cooking grid. However, the related art does not teach a smoker box that can be removed from the grill independently of the flavor bar. Also, the flavor bar cannot be used in conjunction with ceramic briquettes to evenly distribute heat.

Of the above prior art or products found for sale, none of the flavor bars or heat plates are particularly adapted for adjusting to fit most gas grills, or combine the inverted V shape with ceramic briquettes in order to maximize the uniform distribution of heat, or have a smoke flavoring enclosure that is independently removable from the flavor plate.

In the following detailed descriptions of various exemplary embodiments, reference is made to the accompanying drawings that form a part hereof, and in which is shown, by way of illustration, specific embodiments that may be practiced. It is to be understood that other embodiments may be utilized and structural changes may be made without departing from the scope of the present disclosure.

FIG. 1 is an illustration of a perspective view of one exemplary embodiment of the food flavoring apparatus 5. FIG. 1 shows an inverted V-shaped lower plate 20 slidably engaged with and beneath an inverted V-shaped upper plate 10, a smoker box 30 slidably engaged with and resting on the upper plate 10, and an inverted V-shaped smoker box lid 40 resting upon the smoker box 30.

Figure 2:
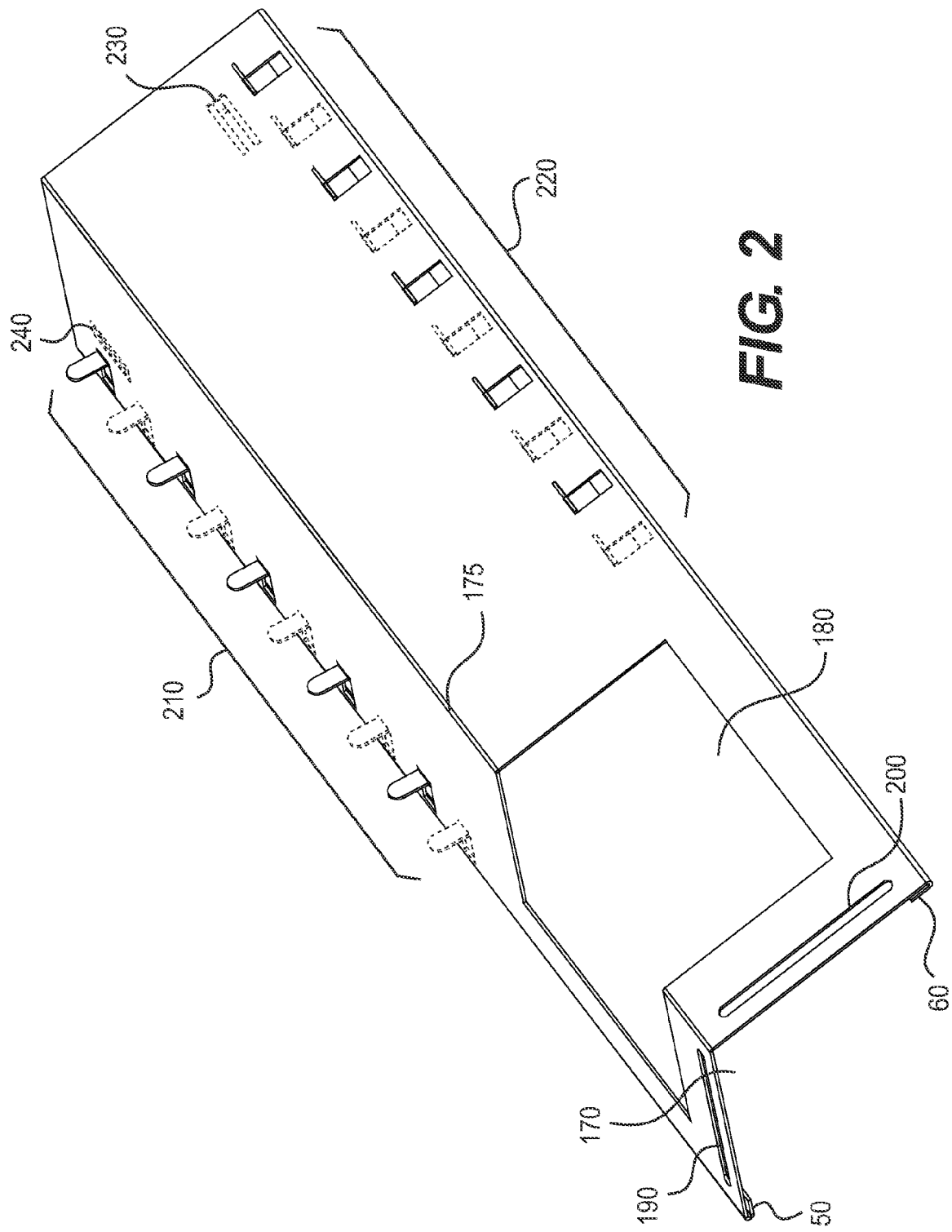
FIG. 2 is an illustration of an exemplary embodiment of the upper plate of the food flavoring apparatus.

FIG. 2 is an illustration of a perspective view of one exemplary embodiment of the upper plate 10 of the food flavoring apparatus 5. Grooves 50 and 60 that slidably accept the lower plate can be seen more clearly than in FIG. 1. The interior angle 170 of the V-shape is between 90-120 degrees with an apex 175 that can be sharp-edged or soft-edged (e.g. rounded). The cutout 180, shaped to slidably accept the smoker box 30, is located nearer to one end of the upper plate 10. Optionally, elongated slots 190 and 200 may be positioned between one end of the upper plate 10 and the cutout 180. The elongated slots 190 and 200 are illustrated in FIG. 2 as being rectangular in shape. However, they may be of any shape, having, for example, rounded ends. The slots 190 and 200 are used in some gas grills to engage and retain the food flavoring apparatus. A plurality of upward tangs 210 and 220 may be substantially perpendicular to the top surfaces of the upper plate 10 and, in some embodiments, are "bent upward" from the underlying material of upper plate 10. The upward tangs 210 and 220 operate to retain grilling stones or ceramic briquettes on top of the apparatus. A plurality of locking features 230 and 240 are optionally provided in a shape to engage the lower plate 20 at discrete locations to give the user apparatus length adjustability.

Figure 3:
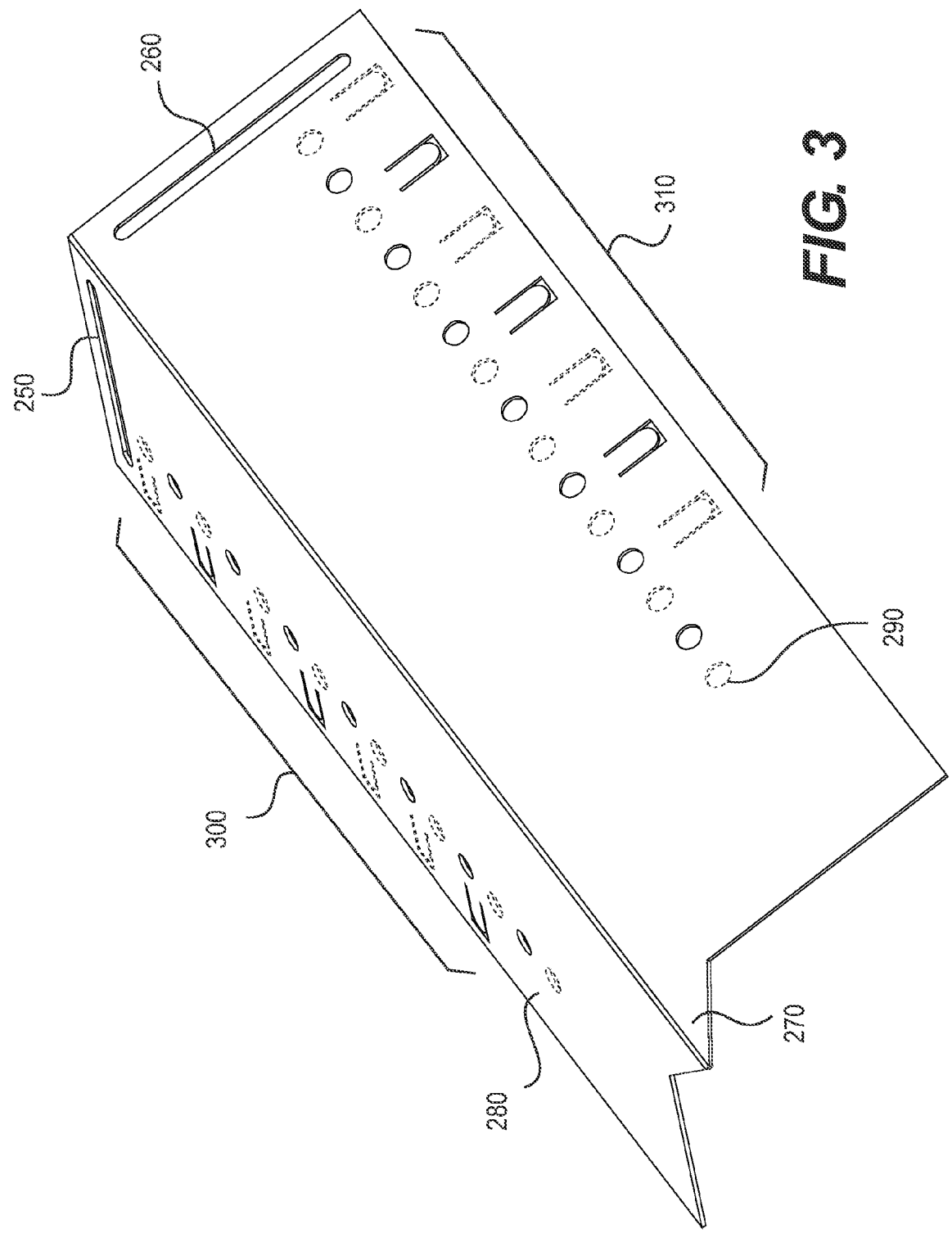
FIG. 3 is an illustration of an exemplary embodiment of the lower plate of the food flavoring apparatus.

FIG. 3 is an illustration of a perspective view of one exemplary embodiment of the lower plate 20 of the food flavoring apparatus 5. Optionally, elongated slots 250 and 260 may be positioned at one end of the lower plate 20. The elongated slots 250 and 260 are illustrated in FIG. 3 as being rectangular in shape. However, they may be of any shape, having, for example, rounded ends. Similar to the slots 190 and 200, slots 250 and 260 are used in some gas grills to engage and retain the food flavoring apparatus 5. An optional overhanging tab 270 may be positioned at the opposite end of the slots 250 and 260. The tab 270 will accommodate some grills with a ledge protruding from substantially vertical walls by reversing the insertion direction of the lower plate into the upper plate. A plurality of locking receptacles 280 and 290, shown in FIG. 3 as holes or indentations in the lower plate 20, may be evenly spaced and may be parallel to the spine of the V-shape. The locking receptacles 280 and 290 operate to engage the plurality of locking features 230 and 240 of the upper plate 10. A plurality of tangs 300 and 310 may remain flat or may be bent upward and substantially perpendicular to the top surfaces of the lower plate 20 to accommodate placement of ceramic briquettes or other grilling stones.

Figure 4:
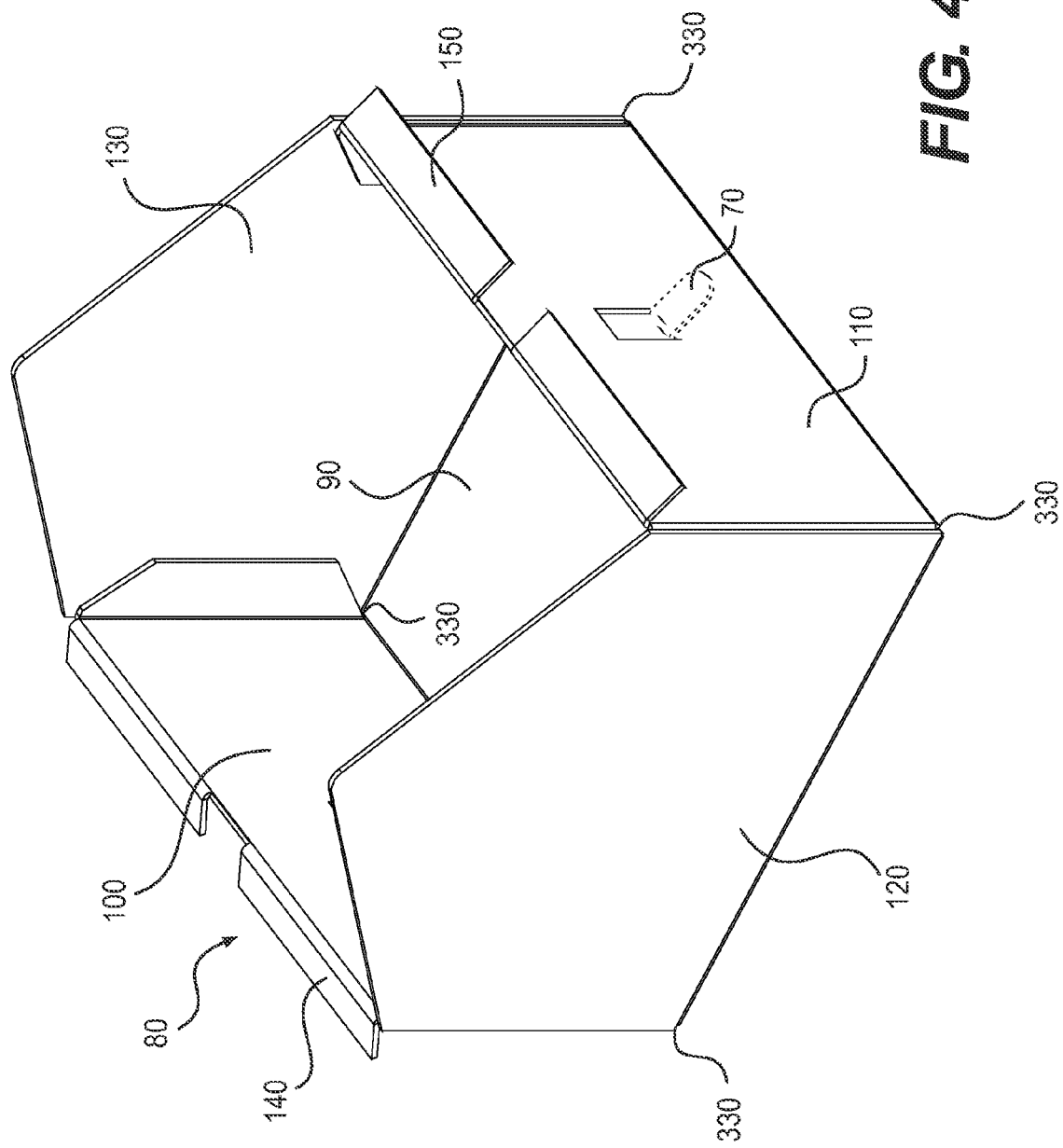
FIG. 4 is an illustration of an exemplary embodiment of the smoker box.

FIG. 4 is an illustration of a perspective view of one exemplary embodiment of the smoker box 30 of the food flavoring apparatus 5. The smoker box 30 may have a plurality of tabs 70 and 80 (obscured from view), or extensions, that may be flush with its walls 100 and 110 or may protrude from the walls 100 and 110 to limit insertion depth into the upper plate 10. A bottom wall 90 of a smoker box 30 may be substantially flat and may be substantially perpendicular to the lateral walls 100 and 110 and transverse walls 120 and 130. The lateral walls 100 and 110 and transverse walls 120 and 130 may be substantially flat. The lateral walls 100 and 110 may have discontinuous ridges 140 and 150 that support the smoker box lid 40 and serve as the maximum limit for insertion depth. When rotated 90 degrees, the ridges 140 and 150 serve as the minimum insertion limit. The wall intersections of the smoker box 30 may have a plurality of small openings 330 in each corner to restrict oxygen to the food flavoring or smoking articles. In some embodiments, the small openings 330 may be located at other desired locations in any of the smoker box 30 walls, or not at all.

Figure 5:
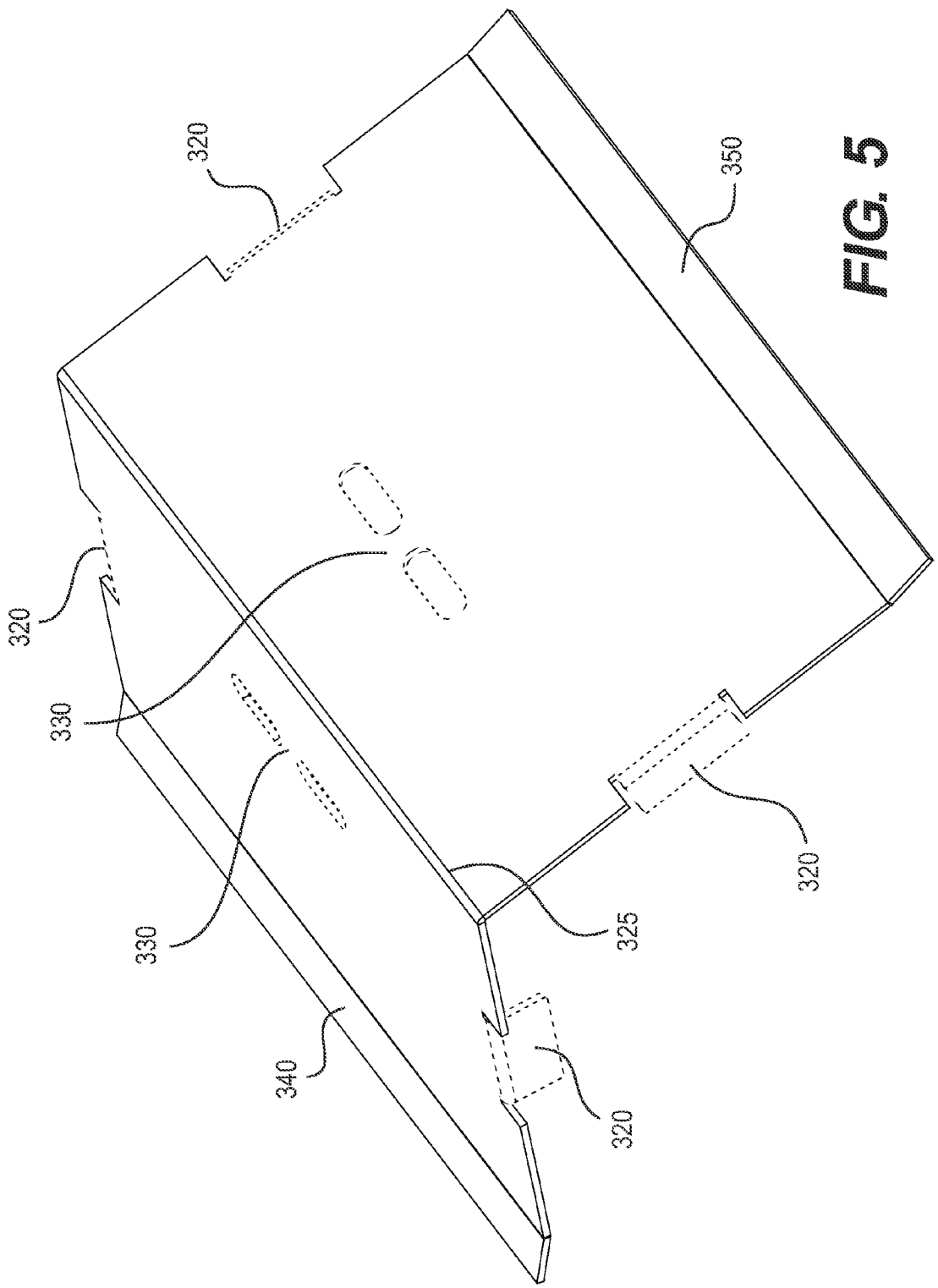
FIG. 5 is an illustration of an exemplary embodiment of the smoker box lid.

FIG. 5 is an illustration of a perspective view of one exemplary embodiment of the smoker box lid 40 of the food flavoring apparatus 5. The smoker box lid 40 may have a plurality of downward protruding tangs 320 that may be substantially perpendicular to the surface from which the tangs 320 project. There may be a plurality of slots 330 parallel to the spine 325. The slots 330 may be sized, shaped, and spaced to accept the tines of a common grilling fork. The edges of the smoker box lid 40 may have a plurality of ridges 340 and 350 bent slightly upward to provide a user with means in which to lift the smoker box lid 40.

Figure 6:
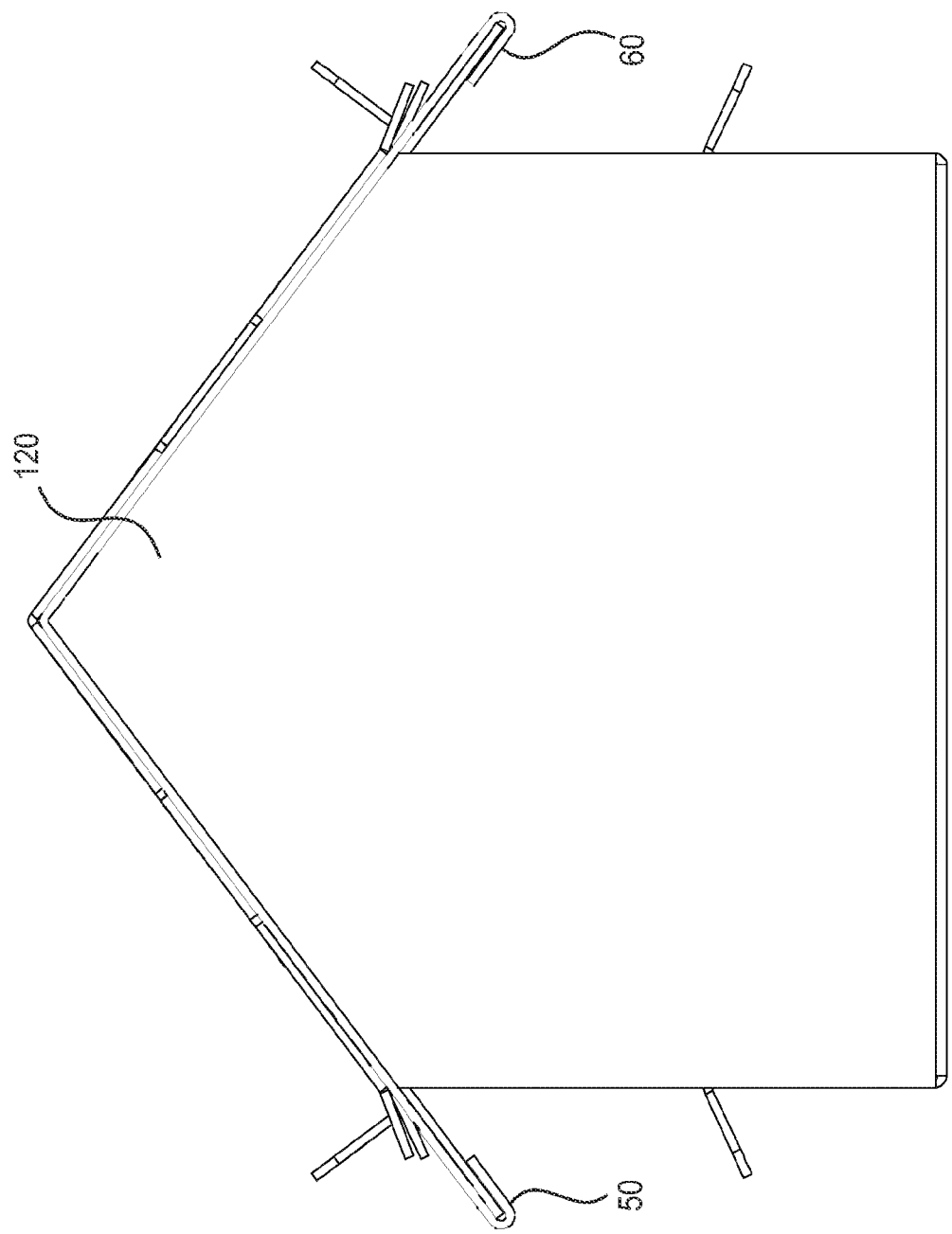
FIG. 6 is an illustration of an exemplary embodiment of the food flavoring apparatus showing a cross-section.

FIG. 6 is an illustration of a cross-section view of one exemplary embodiment of the food flavoring apparatus 5. The tops of the transverse walls 120 and 130 (obscured from view) are shaped to substantially match the contour of the bottom surfaces of the smoker box lid 40. The mating features 50 and 60 are grooves that slidably accept the lower plate is one exemplary engagement.

Figure 7:
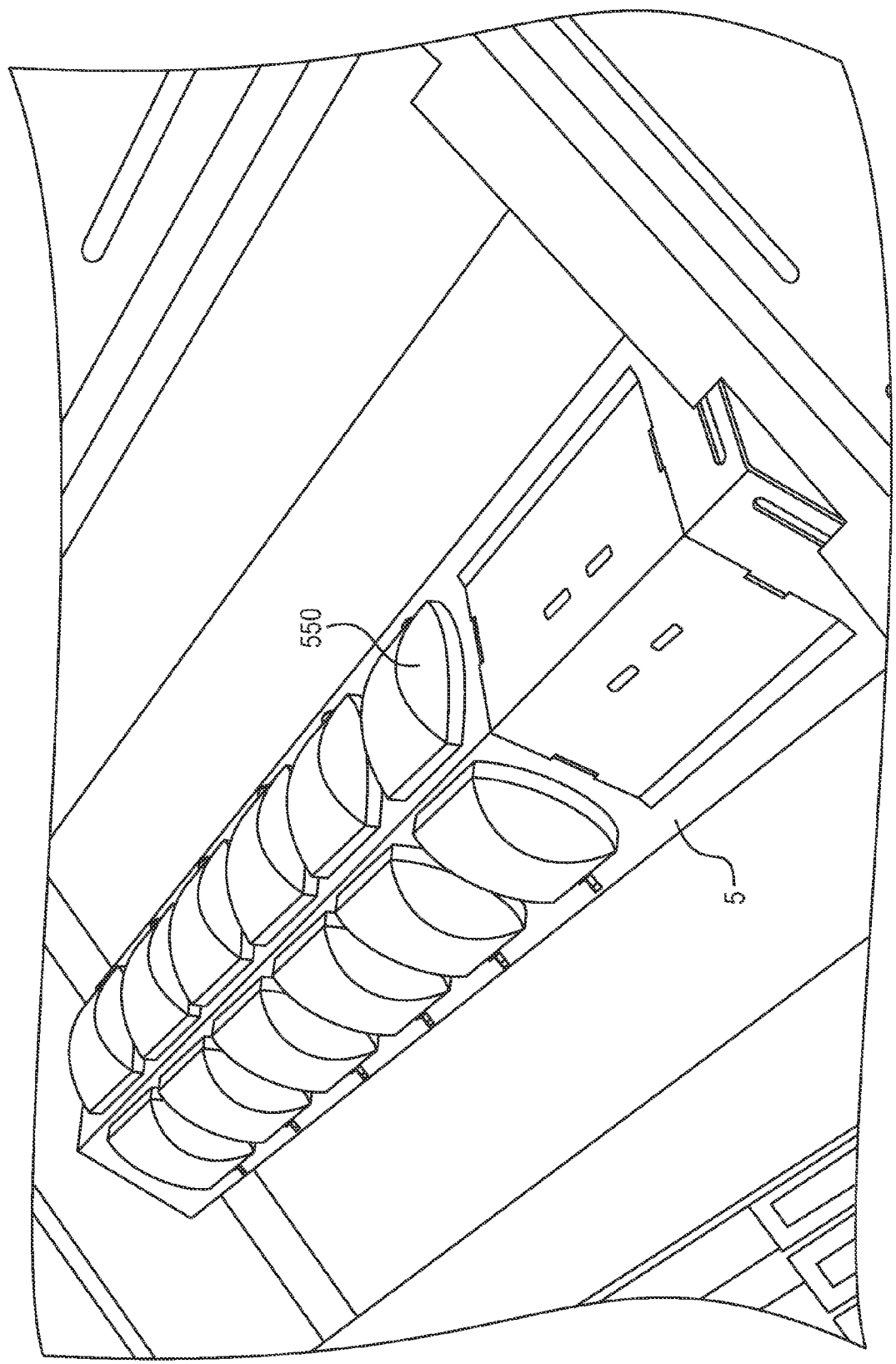
FIG. 7 is an illustration of an exemplary embodiment of the food flavoring apparatus with ceramic briquettes and installed into a gas grill.

FIG. 7 is an illustration of a perspective view of one exemplary embodiment of the food flavoring apparatus 5 installed into a common gas grill with ceramic briquettes 550 placed upon the top surfaces of the upper plate 10 and lower plate 20. The briquettes 550 are suspended via tangs 210 and 220.

In one prototype fabricated by the inventor, stainless steel sheet metal of approximately 0.03 inches in thickness was used. A flat form (unbent) of the upper plate, lower plate, smoker box, and smoker box lid was traced onto a sheet of metal and then cut along that trace using a guided laser. Other cutting methods can be used such as metal stamping, metal shearing, or abrasive water jet. Once cut, each form was bent into the desired final shape using a brake press, but other bending methods can be used such as pressing the form into a mold. The dimensions of the prototype's upper plate are approximately 12.5 inches long and approximately 1.59 inches in height. The dimensions of the lower plate are approximately 8.05 inches long and approximately 1.515 inches in height. The dimensions of the smoker box are approximately 3.125 inches square and a peak height of approximately 3.017 inches. The dimensions of the smoker box lid are approximately 3.245 inches long and approximately 1.288 inches in height. The interior angle of the inverted V-shape of the upper plate, lower plate, and smoker box lid is approximately 106.26 degrees. This interior angle, when used in conjunction with pyramid-shaped ceramic stones, has shown irradiant heating efficiency improvements exceeding 5%. However, as previously mentioned, the angle can vary between 90 and 120 degrees. When assembled, the prototype apparatus can be adjusted to a maximum locked length of approximately 19 inches. Of course, other lengths (shorter or longer) may be devised.

Because oxygen must be restricted to the articles within the smoker box during use on a gas grill, the lateral and transverse walls were joined together using electric current tack welding. Other joining methods can be used such as adhesive, press fit, or various forms of metal welding. In one exemplary embodiment of the present disclosure, oxygen is restricted by providing openings located at each of the four corners of the smoker box. The openings as shown in the illustrations are a by-product of the manufacturing method used to create a prototype made from sheet metal, but could be created by other means such as grinding or drilling. The openings are generally not greater than 0.1 inches across. When tested on a gas grill, the prototype comprising stainless steel sheet metal for the upper plate, lower plate, smoke box, and smoker box lid produced smoke from dry mesquite wood chips in approximately 2.5 minutes.

Other embodiments of the present disclosure are contemplated. For example, the overall shape of the apparatus when viewed from one end could be an inverted W or an inverted U. If an inverted V or inverted W shape, then the spine(s) could be substantially rounded. With these different shapes, or using the V-shape, the apparatus can have a different overall length and overall width to suit different gas grills. Additionally, the thickness of the metal may be increased or decreased depending on the material selected. Further, mating features used to join the upper plate and lower plate include but are not limited to a formed groove, a welded track, metal clips, or screws. Therefore, other acceptable substitutes for the locking features illustrated in the figures may be used without departing from the spirit and scope of this disclosure. Still further, another embodiment of the upper plate may have more or less tangs to retain the grilling stones, may be alternately shaped, and may be joined to the top surface of the upper and lower plates rather than formed. Yet still further, the upper plate smoker box cutout may not be centered along the spine or apex.

The food flavoring apparatus can be formulated as a kit that at least includes the upper plate, lower plate, smoker box, smoker box lid, and grilling stones. Other items may be included with the kit such as a tang bending tool, wood chips or other smoking articles, or grilling utensils such as a grilling fork or wire brush.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An adjustable length flavor bar apparatus for use in gas grills with a removable smoker box having a flavor bar shaped lid, comprising:

a multi-piece flavor bar having inverted substantially V-shaped first and second nested plates with a smoker box cutout positioned substantially nearer to an end of the first plate and substantially centered on a spine of the first plate, wherein the second plate is slidably inserted into a plurality of grooves beneath the first plate so ends of the plates can support the multi-piece flavor bar when adjusted in length to be installed into a grill; and a removable smoker box, comprising an inverted substantially V-shaped removable lid substantially matching a profile of the first plate and covering the smoker box cutout, and a removable box sized to fit within the smoker box cutout, having an open top and a plurality of outward extending ridges at a top edge of two opposing walls of the removable box and a plurality of user-bendable tangs below the top of the edges, so the removable box can be supported within the smoker box cutout by the ridges or the user-bendable tangs to affect a smoke rate, wherein top edges of remaining two opposing walls of the removable box are inverted substantially V-shaped to substantially match a profile of the first plate, wherein the plates and lid cooperate to substantially form a flavor bar shape.

2. The apparatus as in claim 1, wherein the first plate further comprises a plurality of locking features particularly adapted for engaging the second plate at discrete locations to fix the first and second plate assembly at a user defined length.

3. The apparatus as in claim 1, wherein the first plate further comprises a plurality of tangs protruding upwards substantially perpendicular to a top surface of the first plate, whereby said tangs retain grilling stones or ceramic briquettes.

4. The apparatus as in claim 1, wherein the first plate's interior angle of the V-shape is between 90-120 degrees.

5. The apparatus as in claim 1, wherein the first plate's interior angle of the V-shape is approximately 106 degrees.

6. The apparatus as in claim 1, wherein the first plate further comprises slots in the end nearest the smoker box cutout, whereby the slots accept a ledge of some gas grills.

7. The apparatus as in claim 2, wherein the second plate further comprises a plurality of locking receptacles particularly adapted for accepting some of the locking features of the first plate.

8. The apparatus as in claim 7, wherein the first plate further comprises a plurality of bendable tangs that are substantially flush with a top surface of the second plate.

9. The apparatus as in claim 1, wherein the second plate further comprises slots located in the end away from the smoker box cutout, whereby the slots accept a ledge of some gas grills.

10. The apparatus as in claim 1, wherein the wall thickness is between 0.02-0.04 inches, the thickness permitting smoking articles in the removable box to smolder and emit smoke within 5 minutes from initial heating.

11. The apparatus as in claim 1 wherein the wall thickness is approximately 0.03 inches, and whereby smoke is emitted within approximately 2.5 minutes from initial heating.

12. The apparatus as in claim 1, wherein the removable box has a plurality of openings that accommodate airflow.

13. The apparatus as in claim 1, wherein the removable lid further comprises two equal, elongated, transversely oriented slots in each surface positioned near the apex of the removable lid, and sized and shaped to accept the tines of a common grill fork.

14. The apparatus as in claim 1, wherein the removable lid further comprises a plurality of downward facing tangs that are substantially perpendicular to bottom surfaces of the removable lid and are located in the transverse ends of the removable lid.

15. The apparatus as in claim 3, further comprising, grilling stones or ceramic briquettes retained on the tangs.

* * * * *